Sept. 28, 1954  G. H. MUSSELMAN  2,690,557
LONG-RANGE NAVIGATION SYSTEM
Filed Sept. 18, 1945  2 Sheets-Sheet 1

INVENTOR
GLENN H. MUSSELMAN
BY
ATTORNEY

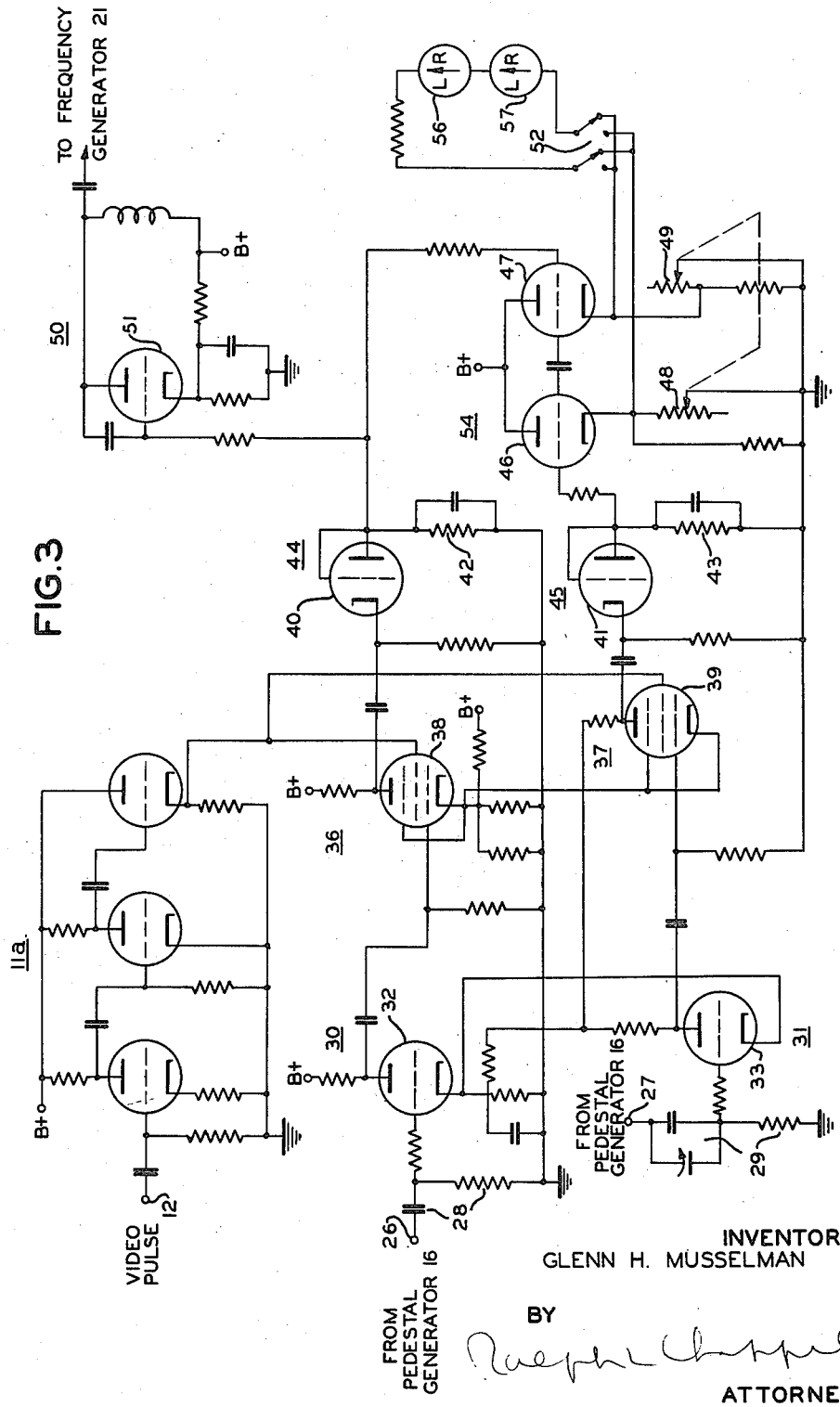

Patented Sept. 28, 1954

2,690,557

UNITED STATES PATENT OFFICE 2,690,557

LONG-RANGE NAVIGATION SYSTEM

Glenn H. Musselman, Boston, Mass., assignor, by mesne assignments, to the United States of America as represented by the Secretary of the Navy Application September 18, 1945, Serial No. 617,145

8 Claims. (Cl. 343—103)

This invention relates to long range navigation apparatus, and particularly to apparatus permitting comparison of the difference in arrival time of corresponding pulses of two series of pulse emissions from spaced transmitters with a fixed time interval.

In patent application, Serial No. 599,163, filed June 13, 1945, of J. A. Pierce, D. E. Kerr, and J. C. Street is disclosed a long range navigation system which permits a navigator to locate himself on the surface of the earth. This comprises broadly two pairs of spaced pulse transmitters, one transmitter of each pair having though not necessarily the same location, and a receiver for the pulses with the necessary timing equipment at the point to be located. The difference in arrival time of corresponding pulses from each pair of transmitters is measured. With this information and information as to the time relationship of the corresponding pulses from each pair of transmitters a location may be established along two spherical hyperbolas having their foci at respective pairs of transmitters. The intersection of these hyperbolas will fix the position of the receiver.

It is obvious that from each pair of transmitters there will be a series of hyperbolas each corresponding to a particular difference in arrival time of corresponding pulses from the pair of transmitters. The present invention utilizes these hyperbolas corresponding to a pair of transmitters as lines of position for navigation therealong, and is particularly useful in aerial navigation. A desired line of position is selected, and once a position is established thereon, this position may be maintained by a device indicating the deviation and the direction of deviation from the selected line.

It is an object of this invention to provide apparatus for navigating along a selected line of position established by a pair of pulse transmitters.

It is a further object of this invention to provide apparatus for indicating the deviation and the direction of deviation from a selected line of position established by a pair of pulse transmitters.

It is a further object of this invention to provide apparatus for comparing the difference in arrival time of corresponding pulses of two similar series of pulse emissions from a pair of transmitters with a known time interval.

Other and further objects will appear during the course of the following descripiton taken together with the accompanying drawings in which:

Fig. 3 is a circuit diagram of a portion of the block diagram disclosed in Fig. 1.

Figure 1:
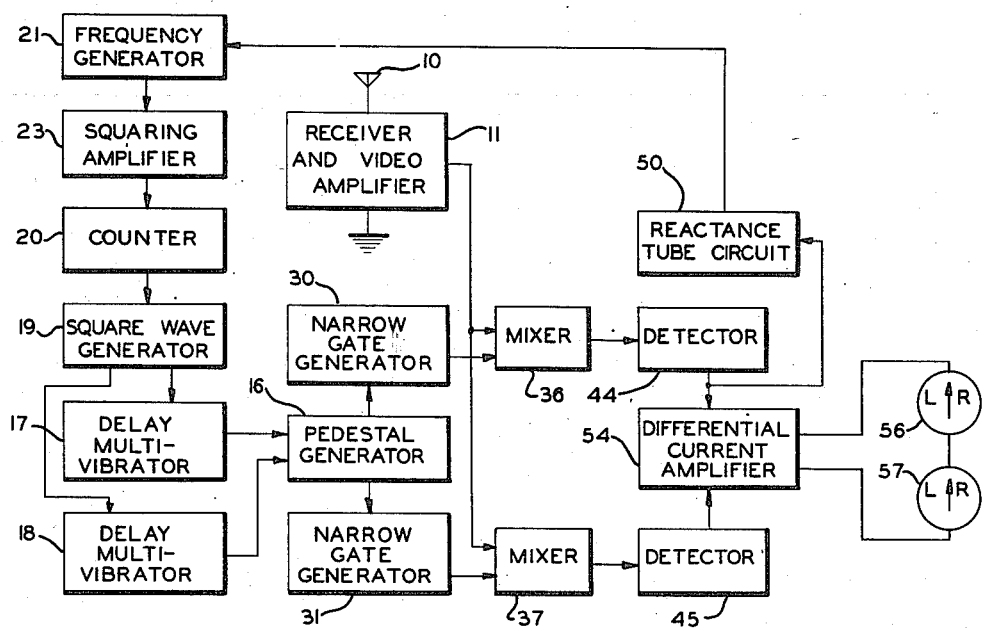
Fig. 1 is a block diagram of the invention.

Considering now the block diagram in Fig. 1, the known time interval is obtained from a long range navigation receiver of the type disclosed in the above-mentioned application. The elements of this receiver necessary for the operation of the instant invention are included in the block diagram. A timing wave is obtained from frequency generator 21 which is of the crystal controlled type to maintain the frequency of the output extremely stable. The output of this generator after being squared in squaring amplifier 23 is applied to counter 20 where the frequency is reduced to the desired amount, say from 100 kilocycles to 50 cycles. The output of counter 20 is applied to square wave generator 19 to produce a 25 cycle square wave. Multivibrator 17 is responsive through a suitable differentiating circuit to the leading edge of the positive half of this square wave, while multivibrator 18 is responsive to the leading edge of the negative half of this square wave through a similar differentiating circuit. Multivibrator 17 is set to produce a fixed delay, while multivibrator 18, which is essentially two multivibrators in series one producing a stepped delay and the other a fine variable delay, produces a variable delay. Thus, a time interval, variable over a range sufficient for purposes of this invention may be obtained. This time interval is equal to the excess of delay of multivibrator 18 over multivibrator 17 plus one-half the period of the rectangular wave output of generator 19. Generator 16 produces a pedestal pulse in response to the trailing edges of the outputs of multivibrators 17 and 18 through suitable differentiating circuits, which trailing edges correspond to the delayed time produced by these multivibrators. The leading edges of the pedestals produced by generator 16 operate narrow gate generators 30 and 31 to produce substantially rectangular pulses of a width in the order of 15 microseconds, which are applied to mixers 36 and 37, respectively. For each cycle of the square wave generator 19 a pair of these rectangular pulses will be produced and are indicated by letters C and D in Fig. 2.

The pulse emissions from a pair of transmitters are picked up by antenna 10, detected and amplified in receiver 11, and applied to mixers 36 and 37. These pulses are shown in video form as A and B in Fig. 2, A being the pulse from the controlling or "master" station and B being the pulse from the controlled or "slave" station. The pulses are triangular in shape with a width of about 70 microseconds. Each mixer, to be later described in more detail, in conjunction with its respective detector puts out a negative direct voltage when the narrow gate and video inputs are synchronous, the magnitude of this voltage corresponding to the occurrence of the narrow gate on the leading edge of the video pulse. The direct voltage from detector 44 is utilized to control the frequency of generator 21 through a reactance tube circuit 59. This voltage is applied to circuit 50 in such value and direction as to maintain the time of occurrence of gate pulse C at a point of time about midway on the leading edge of pulse A, which is the pulse from the controlling or "master" transmitter.

The voltage output of detector 45 will then be an indication of the time relationship of the narrow gate from generator 31, namely D, with reference to a point in time about midway on the leading edge of pulse B. The magnitudes of detector voltages 44 and 45 are compared by means of a differential current amplifier 54 whose direct current outputs are fed to direct current zero center milliameters 56 and 57, which are each used as indicators of the relative magnitudes of the detector voltages.

Referring now to Fig. 3 where a circuit diagram is disclosed of the elements of the invention which are used in conjunction with the receiver and time measuring apparatus of the above-mentioned patent application. The pedestals from generator 16 corresponding to the delay established by fixed and variable multivibrators 17 and 18 are negatively applied to terminals 26 and 27, and thence to the grids of the tubes 32 and 33 through differentiating circuits 28 and 29. The values of the circuit constants are such as to maintain the grids below cut-off for about 15 microseconds to produce a positive substantially rectangular gate pulse of about 15 microseconds width at the plate of each of tubes 32 and 33. These gate pulses are applied to the respective grids of mixer tubes 38 and 39, whose cathodes are biased to about 15 volts positive to prevent plate current flow when the grid is at ground potential. The pulses from the transmitters after detection are applied to terminal 12 and after amplification in amplifier 11a are applied to the screens of mixer tubes 38 and 39. When the grid and screen of either of these tubes are energized together a negative voltage will appear on the plate, whose magnitude depends on the magnitude of the screen voltage when the grid is energized. In other words the magnitude of this negative voltage depends on the time on the slope of the video pulse when the narrow gate is applied to the grid.

Figure 2:
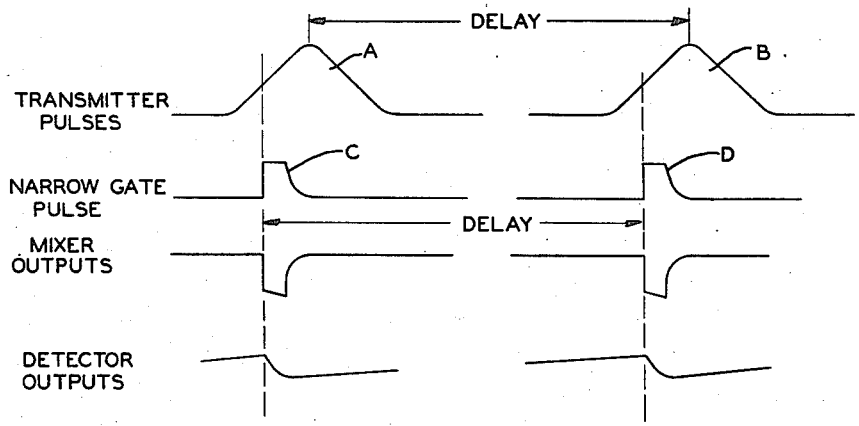
Fig. 2 is a diagram of certain wave forms existing in the invention.

Rectifier tubes 40 and 41 in conjunction with respective time constant circuits 42 and 43 produce negative direct voltages corresponding to the magnitudes of the respective pulses at the plates of tubes 33 and 39. Wave forms of the mixer and detector output are shown in Fig. 2. The direct voltage output of detector 44 is applied to the grid of reactance tube 51, whose plate to cathode circuit is effectively in parallel with the tank circuit of the crystal of frequency generator 21. Thus a change in voltage on the grid of reactance tube 51 produces a corresponding change in the resonant frequency of the tank circuit and pulls the crystal frequency in the direction of the change. This is sufficient to maintain the narrow pulse C in synchronism with any desired position on the leading ledge of video pulse A.

The direct voltage from detector 44 is also applied to the grid of differential amplifier tube 47, and the voltage from detector 45 is likewise applied to the grid of the other differential amplifier tube 46. The cathodes of tubes 46 and 47 are connected through milliameters 56 and 57. Cathode resistors 48 and 49 are ganged to permit inverse adjustment of their magnitudes. This is to provide a meter centering control. With the receiver located on the desired line of position, this ganged resistance may be adjusted for zero reading. This compensates for any inequalities that may exist in the differential amplifier or the circuit paths leading thereto. Reversing switch 52 is necessary to orient the right and left indication properly in accordance with the direction chosen along the selected line of position. In practice two meters or indicators 56 and 57 in series have been found practicable, one for the pilot and the other for the navigator who ordinarily occupy different stations.

The invention may be used to indicate when a certain line of position has been reached by setting the multivibrators for a time difference corresponding to the difference in arrival time of the pulses determining this line of position by noting when meters 56 and 57 give a zero reading, assuming that resistors 48 and 49 have been adjusted beforehand to equalize the circuit. Switch 52 is thrown to the position where the meters indicate the correct deviation from the line of position in accordance with the chosen direction of travel. When a zero reading is obtained, the selected line of position is reached. It is then only necessary for the pilot to maintain this zero reading in order to fly a course along the selected line of position.

It is to be noted that the meters indicate not only the direction of deviation from a selected line of position, but also the amount of swing from zero gives an indication of the distance or deviation from the selected line. It is to be understood that the trailing edges of the video pulses may also be used for synchronizing with the gate pulses.

The scope of the invention is defined in the following claims.

I claim:

1. Apparatus for comparing the difference in arrival time of pulses of a recurrent series of pulse emissions from a first remotely located transmitter and of corresponding pulses of a similar recurrent series of pulse emissions from a second remotely located transmitter with a fixed time interval comprising, means for generating a series of pairs of pulses of the same recurrence frequency as said pulse emissions, the time delay between the pulses of each of said pairs corresponding to said fixed time interval, means for receiving said pulse emissions, means for producing voltages having magnitudes corresponding to the time difference in the occurrence of said pair of pulses with reference to respective emission pulses, and means for comparing the magnitudes of said voltages.

2. Apparatus for comparing the difference in arrival time of pulses of a recurrent series of pulse emissions from a first transmitter and of corresponding pulses of a similar recurrent series of pulse emissions from a second remotely located transmitter with a fixed time interval comprising, means for generating a series of pairs of pulses of the same recurrence frequency as said pulse emissions, the time delay between the pulses of each of said pairs corresponding to said fixed time interval, means for receiving said pulse emissions, means for producing voltages having magnitudes corresponding to the time difference in the occurrence of said pair of pulses with reference to respective emission pulses, means responsive to one of said voltages for synchronizing the corresponding pulse of said pair and said emission pulse, and means for comparing said other voltage with said one voltage to provide an indication of the time difference in occurrence of the other corresponding pulse of said pair and said emission pulse.

3. Apparatus for comparing the difference in arrival time of pulses of a recurrent series of pulse emissions from a first transmitter and of corresponding pulses of a similar recurrent series of pulse emissions from a second remotely located transmitter with a fixed time interval comprising, means for generating a series of pairs of substantially rectangular pulses of the same recurrence frequency as said pulse emissions, the time delay between the pulses of each of said pairs corresponding to said fixed time interval, means for receiving said pulse emissions, means for mixing said received pulse emissions with corresponding pulses of said pair to produce voltages having magnitudes corresponding to the time difference in the occurrence of said pair of pulses with reference to the leading edges of the respective emission pulses, means for detecting said voltages, means responsive to the detected voltage of the leading pulses for synchronizing the earlier pulse of said pair with a fixed position on the leading edge of the earlier of said emission pulses, and means for comparing the magnitudes of the detected voltages to provide an indication of the time difference in occurrence of the later of said pair of pulses with respect to the leading edge of the later of said pulse emissions.

4. Apparatus for comparing the difference in arrival time of pulses of a recurrent series of pulse emissions from a first transmitter and of corresponding pulses of a similar recurrent series of pulse emissions from a second remotely located transmitter with a fixed time interval comprising, means for generating a series of pairs of substantially rectangular pulses relatively narrow with respect to and of the same recurrence frequency as said pulse emissions, the time delay between the pulses of each of said pairs corresponding to said fixed time interval, means for mixing said received pulse emission with corresponding pulses of a said pair to produce pulses having magnitudes corresponding to the time difference in the occurrence of said pair of pulses with reference to fixed points on the leading edges of the respective emission pulses, means for detecting said mixer pulses to produce direct voltages, means responsive to the detector voltage of the leading pulses for synchronizing the earlier pulse of said pair with the fixed point on the leading edge of the earlier of said emission pulses, and means for comparing the magnitudes of the detector voltages to provide an indication of the time difference in occurrence of the later of said pair of pulses with the fixed point on the leading edge of the later of said pulse emissions.

5. Navigation apparatus comprising, means for receiving recurrent series of pulses from a first remote transmitter and from a second remote transmitter, means for locally generating a recurrent series of pulses corresponding to said pulses from said first remote transmitter, means for locally generating a recurrent series of pulses corresponding to said pulses from said second remote transmitter, means for maintaining one of said locally generated pulse series in synchronism with said pulses from said first remote transmitter, means for initially synchronizing the other of said locally generated pulse series with said pulses from said second remote transmitter, and means for continuously indicating the magnitude of the departure from synchronism of the other of said locally generated pulse series with said pulses from said second remote transmitter.

6. Navigation apparatus comprising, means for receiving recurrent series of pulses from a first remote transmitter and from a second remote transmitter, means for locally generating a recurrent series of pulses corresponding in frequency to said pulses from said first remote transmitter, means for locally generating a recurrent series of pulses corresponding in frequency to said pulses from said second remote transmitter, first means for mixing said pulses from said first remote transmitter with said locally generated pulses corresponding thereto, means responsive to said mixing means for maintaining synchronism between said pulses from said first remote transmitter and said locally generated pulses corresponding thereto, means for initially establishing synchronism between said pulses from said second remote transmitter and said locally generated pulses corresponding thereto, and means for continuously indicating the magnitude and the direction of lack of synchronism between said pulses from said second remote transmitter and said locally generated pulses corresponding thereto.

7. Apparatus as in claim 6 wherein said indicating means comprises second means for mixing said pulses received from said second remote transmitter with said locally generated pulses corresponding thereto, means for detecting the output of said second mixing means, means for detecting the output of said first mixing means, and differentiating means responsive to the output of both of said detecting means for providing an output variable in magnitude with variations in synchronism between said pulses from said second remote transmitter and said locally generated pulses corresponding thereto.

8. Navigation apparatus comprising, a receiver and video amplifier for the reception and amplification of recurrent series of pulses from first and second remote transmitters, a square wave generator, first delay means responsive to said square wave generator, second delay means also responsive to said square wave generator, first means for mixing the output of said first delay means with said pulses received from said first remote transmitter, second means for mixing the output of said second delay means with said pulses received from said second remote transmitter, first means for detecting the output of said first mixing means, second means for detecting the output of said second mixing means, reactance means responsive to said first detecting means for maintaining the output of said first delay means in synchronism with said pulses received from said first remote transmitter, differential amplifying means responsive to the outputs of said first and said second detecting means, and visual indicating means responsive to said amplifying means for displaying the magnitude of the departure from synchronism of said pulses from said second remote transmitter and said locally generated pulses mixed therewith.

References Cited in the file of this patent

UNITED STATES PATENTS

| Number | Name | Date |
|---|---|---|
| 2,201,978 | Bedford | May 28, 1940 |
| 2,209,507 | Campbell | July 30, 1940 |
| 2,400,641 | Hardy | May 21, 1946 |
| 2,402,464 | Suter | June 18, 1946 |
| 2,403,527 | Hershberger | July 9, 1946 |
| 2,403,626 | Wolff et al. | July 9, 1946 |
| 2,405,238 | Seeley | Aug. 6, 1946 |
| 2,423,523 | Shmurak et al. | July 8, 1947 |
| 2,430,570 | Hulst | Nov. 11, 1947 |

FOREIGN PATENTS

| Number | Country | Date |
|---|---|---|
| 866,695 | France | May 31, 1941 |